(12) United States Patent
Pieczynski

(10) Patent No.: US 7,337,578 B2
(45) Date of Patent: Mar. 4, 2008

(54) PLANER BOARD LIGHTING DEVICE

(76) Inventor: Darren Edward Pieczynski, N9460 Koskela Rd., Wakefield, MI (US) 49968

( * ) Notice: Subject to any disclaimer, the term of this patent is extended or adjusted under 35 U.S.C. 154(b) by 0 days.

(21) Appl. No.: 11/086,638

(22) Filed: Mar. 21, 2005

(65) Prior Publication Data

US 2006/0207162 A1 Sep. 21, 2006

(51) Int. Cl.
*A01K 75/02* (2006.01)

(52) U.S. Cl. ........................ 43/17.5; 43/43.13

(58) Field of Classification Search .............. 43/17.5, 43/43.13; 362/118
See application file for complete search history.

(56) References Cited

U.S. PATENT DOCUMENTS

| | | | | |
|---|---|---|---|---|
| 4,234,913 A * | 11/1980 | Ramme | ...... | 362/158 |
| 4,429,350 A * | 1/1984 | Guthrie | ...... | 362/120 |
| 4,672,765 A * | 6/1987 | Lutz | ...... | 43/17.5 |
| 4,697,374 A * | 10/1987 | Simms | ...... | 43/17.5 |
| 5,299,107 A * | 3/1994 | Ratcliffe et al. | ...... | 362/158 |
| 5,351,432 A * | 10/1994 | Tse | ...... | 43/17.5 |
| 5,412,897 A * | 5/1995 | Smith | ...... | 43/4 |
| 5,819,465 A * | 10/1998 | Bryant | ...... | 43/16 |
| 5,974,721 A * | 11/1999 | Johnson et al. | ...... | 43/17.6 |
| 5,979,101 A * | 11/1999 | Muenchow | ...... | 43/17 |
| 6,280,049 B1 * | 8/2001 | Tam | ...... | 362/158 |
| 6,408,561 B1 * | 6/2002 | Winter | ...... | 43/17.5 |
| 6,481,148 B1 * | 11/2002 | Lindgren | ...... | 43/17.5 |
| 6,789,350 B1 * | 9/2004 | Link | ...... | 43/43.13 |

* cited by examiner

*Primary Examiner*—Kurt Rowan
(74) *Attorney, Agent, or Firm*—Weiner & Burt, P.C.; Irving M. Weiner; Pamela S. Burt

(57) ABSTRACT

A planer board lighting device. The apparatus comprises a connection to a power source, a light source, and circuitry with electronic components to connect the power source to the light source. A generally clear lens. A rugged waterproof reflective enclosure, with A semi-permanent mounting means to a planer board or flag.

9 Claims, 3 Drawing Sheets

PLANER BOARD LIGHTING DEVICE

BACKGROUND OF THE INVENTION

This invention relates generally to the field of planer board fishing devices, and more particularly to a planer board lighting apparatus to identify locations of fishermen's planer boards.

Fishermen use their fishing vessels as motorized bait presenters to fish by trolling baits with the use of planer boards. Planers boards such as U.S. Pat. No. 5,875,583 issued to Church are devices used to trail several lines from a moving fishing vessel out to the sides of the vessel to both cover more area and to allow the multiple lines to be separated eliminating crossing of lines. The above patent and cited patents will be the reference of planer boards from this point forward.

During low light conditions, many species of fish are in their feeding patterns. Anglers troll planer boards during these times to take advantage of the aggressive fish. The location of the planer boards are important as the planer boards themselves will move toward the back of the fishing vessel once a fish has taken the bait being trolled. This movement of the planer boards is well known in the art. The planer board location is also important when making turns around structure in a particular body of water. These turns are usually made slow as to not again cross the lines connected to the planer boards. The visibility of the planer boards is also important for other boaters and watercraft.

With the locations of the planer boards being important as stated above, anglers have used multiple indication devices to verify the location of the planer board apparatuses. Reflective devices are applied to the planer boards or accompanying flags sometimes associated with the boards. Lights have also been incorporated to a specific planer board as per U.S. Pat. No. 6,789,350 B1, issued to Link. Link states the use of lights, strike indication and sound as part of a specific planer board. These are all very useful properties for a planer board apparatus to not only indicate the location of the boards, but incorporates the other features listed above.

The deficiency of the apparatus claimed in Link's patent is the properties are only useable with the specific apparatus disclosed. Planer boards have existed in many various shapes, sizes, and configurations for many years. An apparatus has not been available to an angler that allows use for all types and multiple configurations of planer boards.

Under low light conditions boaters must conform to lighting regulations for their vessel. Standard regulations state the front of the vessel must have a red light to the port and green to the starboard. When trolling, the planer boards trail and move to the outsides of the boat; therefore, becoming extensions of the moving vessel and need to be seen by oncoming watercraft to avoid collision with the equipment.

The information provided below will address the current deficiencies and provide a solution for anglers to adapt a location device to any style of planer board.

BRIEF SUMMARY OF THE INVENTION

The primary object of the invention is a planer board lighting device.

Another object of the invention is to aid in determining the location of an angler's planer boards in low light conditions.

A further object of the invention is to be adaptable to multiple planer board devices.

Another object of the invention is ability to indicate the location of planer board by the use of an outside light source.

Yet another object of the invention is the ability to be semi-permanently mounted to a planer board itself or flag of planer board if equipped.

A further object of the invention is to indicate the location of planer boards to other fishing vessels on a given body of water.

Yet another object of the invention is variable in color options of the light source.

Further with the object of the invention to be variable in colors; and more specifically red and green color options to aid in boat lighting regulations.

In accordance with a preferred embodiment of the present invention, a planer board lighting device comprises a connection means to an internal power source; a light source; circuitry means to connect said inside power source to said light source; a generally clear or colored lens; a rugged waterproof enclosure, and a means to secure said planer board lighting device to a planer board.

Other objects and advantages will become apparent from the following descriptions, taken in connection with the accompanying drawings, wherein, by way of illustration and example, an embodiment of the present invention is disclosed.

BRIEF DESCRIPTION OF SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
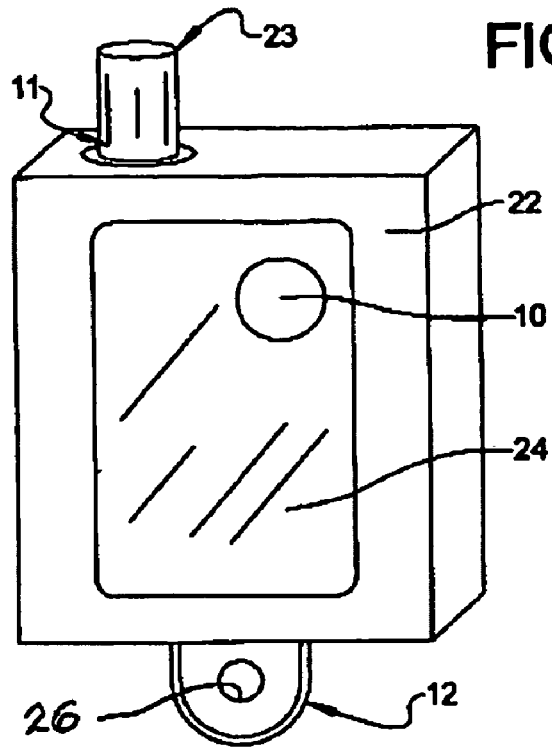
FIG. 1 is a perspective view of the preferred embodiment of the invention.
Figure 1A:
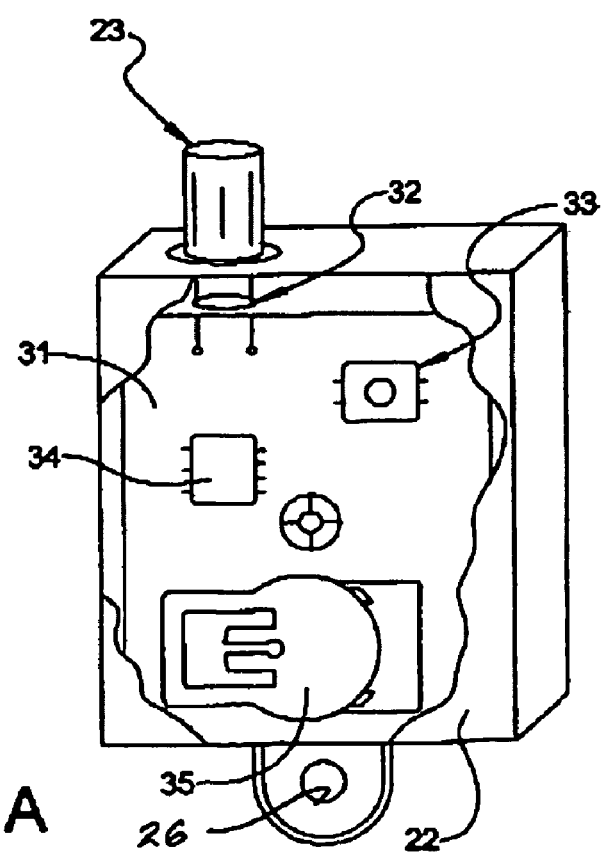
FIG. 1A is a cutaway view of the enclosure exposing view of the printed wiring board, electronic components and power source.

With reference to the drawings, a preferred embodiment is shown in FIG. 1. 22 is a rugged waterproof enclosure to house the electronics of the invention. 23 is a generally clear or colored lens for the light source 32 which is shown in FIG. 1A. 11 is an o-ring for additional Waterproofing of the hole in enclosure 22 to allow the lens 23 to protrude. 24 is a reflective label covering a dome switch 10 utilized for tactile feel. 12 is a flange possessing a hole 26 that is part of the enclosure 22 to accommodate a screw 25 (shown in FIGS. 2 and 3) for mounting to a planer board or flag of a planer board.

FIG. 1A provides a view of the internal electronic for the invention. 31 is a printed wiring board for circuitry means of connecting electronic components, such as, a microcontroller 34 a momentary switch 33 slightly protruding from the enclosure 22 via a hole under dome switch 10 (FIG.1) that is activated by depressing dome switch 10 (FIG.1), a light source 32, e g., a bi-color LED (light emitting diode, red and green in colors), and a coin cell battery power source 35 in a socket for replacement properties. The user may utilize the color options by selecting red for port side planer boards and green for starboard side planer boards to display the location of the boards and the direction of travel per standard boating regulations. The bi-color LED is of high luminous intensity and low power consumption to allow for extended battery life. In an alternate embodiment the light source 32 may reside within the enclosure and the enclosure 22 itself is made of a generally clear material.

Figure 2:
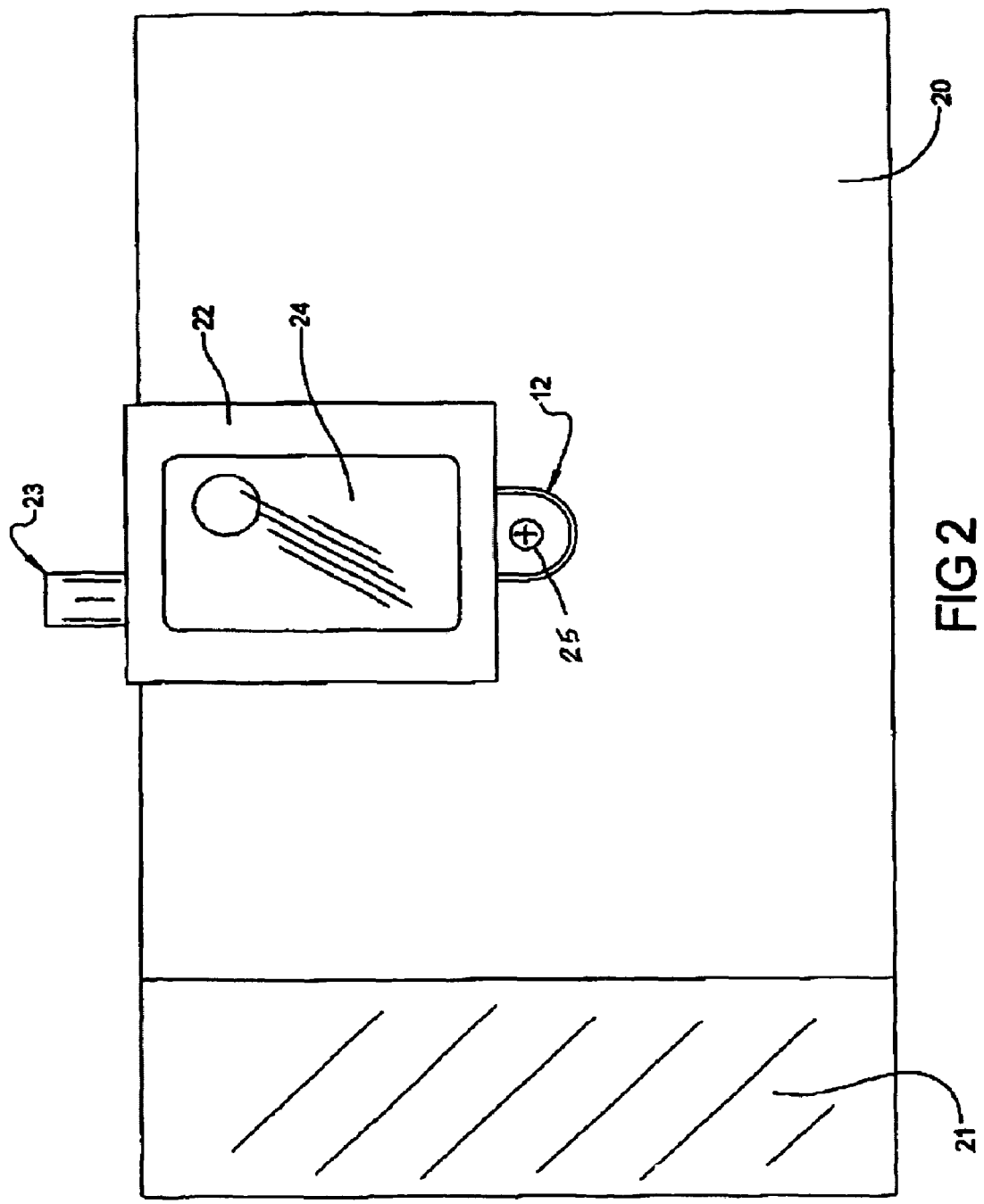
FIG. 2 is a perspective view of the preferred embodiment of the invention mounted to a planer board.

In accordance with the present invention, FIG. 2 displays the preferred enibodixnant mounted to a planer board 20. It should be noted, standard features or hardware of a planer board are purposely not shown in this view. 21 is the tapered end of a standard planer board, so when tolled the board moves out and away from the boat. The chain of events is well known in the art. Flange 12 is screwed to the planer board 20 by the screw 25 to hold the device enclosure 22 securely to the board. Lens 23 is mounted so the light source is above the top of the board so it may be seen 360 degrees. Another board mounting option may locate the lens 23 below the top of the board itself to utilize the board as a reflective property of the light source. The reflective label 24 faces toward the boat so an outside light source, such as a spot light from the boat, can illuminate the reflective properties back to the user in the fishing vessel.

In the preferred embodiment, the operation of the invention is as follows: the dome switch 10 as a single switch to operate the device. When dome switch 10 is depressed, therefore 'making' switch 33, the bi-color LED 32 (FIG. 1A) flashes for one second into sequence of red, green, then off. The user has the option to release the switch in any of these states. If released when red is on, the device will then flash the red LED. When released when green is displayed, green will then flash. If released when the LED is off, the device then turns off. Once the switch is released in any selection, the option selected will be carried out indefinitely until the switch 10 is once again depressed and held through the sequence of red, green, off awaiting the next selection.

An alternate embodiment may use other color options or steady on states of the leds or other light sources. An additional alternate embodiment may allow the power source to reside on the planer board and the light source to be mounted on the flag of the planer board connecting electrically via conductors.

Figure 3:
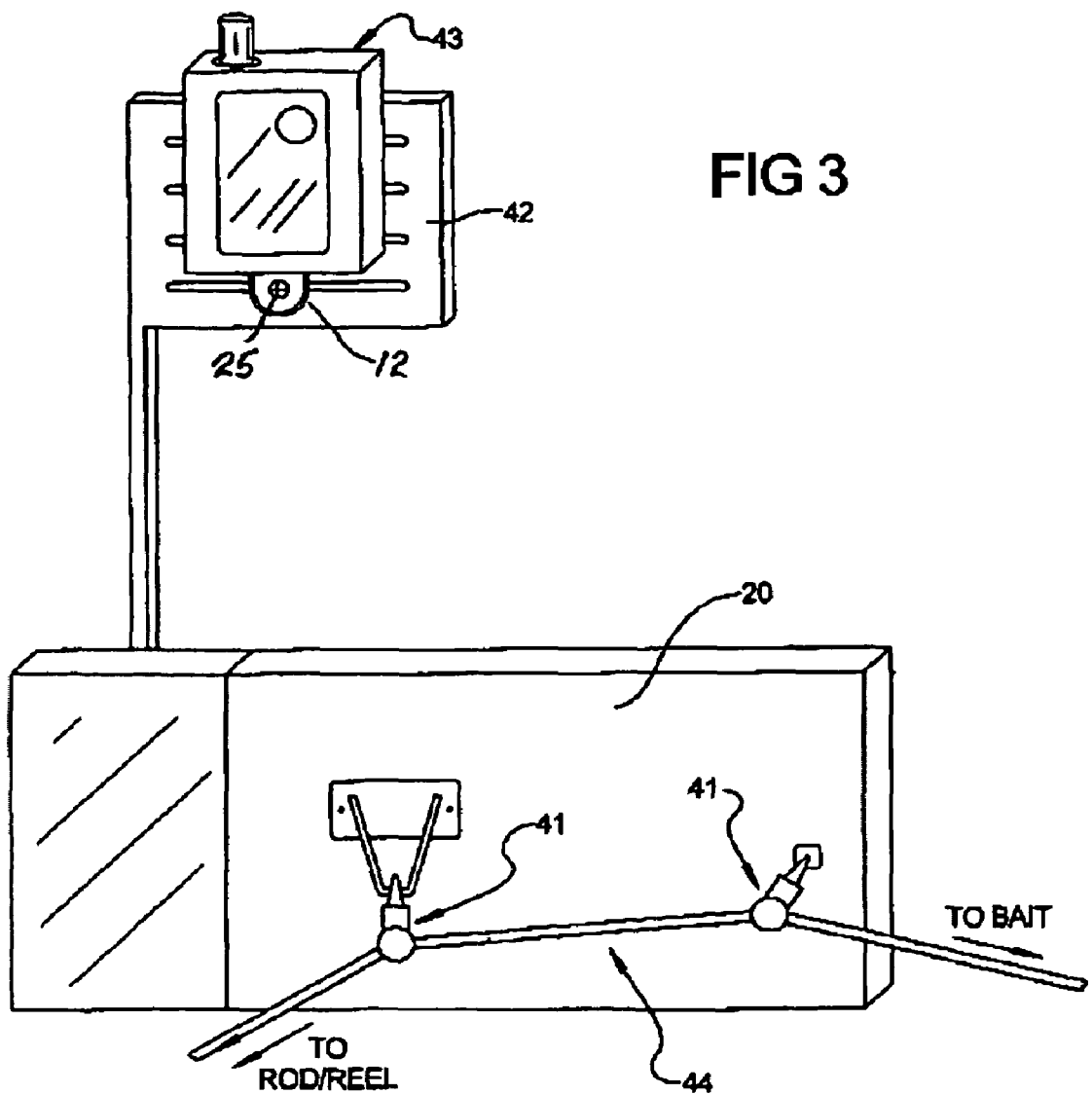
FIG. 3 is a perspective view of the preferred embodiment mounted to the flag of a planer board.

It is another feature of the invention that the device may also be mounted to a flag of a planer board if so equipped. FIG. 3 displays the preferred embodiment 43 of the invention mounted in the same format as in FIG. 2 though or the location of the flag 42 of a planer board. Flags of existing planer boards are stout and allow for such mounting. This mount allows for the highest visibility of the light source display. Also shown in FIG. 3 is the board 20 equipped with clips 41, attaching the fishing line 44 to the board 20. The lead of the line goes toward the boat, and the tail goes our to the bait being trolled. The setup is well known in the art.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A device to aid in determining in low light conditions the location of an external planer board trailing several fishing lines and selectively to light the planer board being pulled by a vessel or a rigid flag of said planer board to conform to standard lighting regulations for the vessel, comprising:

a waterproof enclosure;

a light source operatively and mechanically connected to said enclosure;

an electrical power source, electrical components and circuitry means disposed within said enclosure and connected to said light source;

a lens for said light source;

said lens protruding from said enclosure;

a switch connected to said electrical components and said circuitry means to enable a user of said device to manually and selectively set said light source to an "OFF" condition or to a "RED" or "GREEN" condition to conform to said standard lighting regulations for said vessel;

affixation means for rigidly affixing said device to a rigid portion of said external planer board or to a rigid portion of said rigid flag of said planer board whereby no portion of said device touches any of said fishing lines being trailed by said planer board;

said switch comprises a dome switch protruding from said enclosure;

there is provided a reflective label affixed to said enclosure and covering said dome switch; and said reflective label being positioned relative to said affixation means so that when said device is rigidly affixed to said rigid portion of said external planer board or to said rigid portion of said rigid flag of said planer board, said reflective label faces toward said vessel and reflects back to a user in said vessel light from an external light source being used by said user in said vessel.

2. A device according to claim 1, wherein:

said affixation means includes a flange of said waterproof enclosure having an aperture therein through which a securement device is disposed to rigidly affix said device to said rigid portion of said external planer device or to said rigid portion of said rigid flag of said planer board.

3. A device according to claim 1, wherein:

said switch is operable in conjunction with said electrical components and said circuitry means to enable a user of said device to manually and selectively additionally set said light source to continually flash in said "RED" or "GREEN" condition to conform to said standard lighting regulations for said vessel.

4. A device according to claim 2, wherein:

said switch is operable in conjunction with said electrical components and said circuitry means to enable a user of said device to manually and selectively additionally set said light source to continually flash in said "RED" or "GREEN" condition to conform to said standard lighting regulations for said vessel.

5. A device according to claim 1, wherein:

said switch is operable in conjunction with said electrical components and said circuitry means to enable a user of said device to manually and selectively additionally set said light source to be illuminated in a steady fashion in said "RED" or "GREEN" condition to conform to said standard lighting regulations for said vessel.

6. A device according to claim 2, wherein:
said switch is operable in conjunction with said electrical components and said circuitry means to enable a user of said device to manually and selectively additionally set said light source to be illuminated in a steady fashion in said "RED" or "GREEN" condition to conform to said standard lighting regulations for said vessel.

7. A device according to claim 3, wherein:
said switch is operable in conjunction with said electrical components and said circuitry means to enable a user of said device to manually and selectively additionally set said light source to be illuminated in a steady fashion in said "RED" or "GREEN" condition to conform to said standard lighting regulations for said vessel.

8. A device according to claim 4, wherein:
said switch is operable in conjunction with said electrical components and said circuitry means to enable a user of said device to manually and selectively additionally set said light source to be illuminated in a steady fashion in said "RED" or "GREEN" condition to conform to said standard lighting regulations for said vessel.

9. A device according to claim 1, wherein:
said light source is of multiple color options; and
said lens is of multiple color options.

* * * * *

UNITED STATES PATENT AND TRADEMARK OFFICE
CERTIFICATE OF CORRECTION

| | |
|---|---|
| PATENT NO. | : 7,337,578 B2 |
| APPLICATION NO. | : 11/086638 |
| DATED | : March 4, 2008 |
| INVENTOR(S) | : Darren Edward Pieczynski |

It is certified that error appears in the above-identified patent and that said Letters Patent is hereby corrected as shown below:

Col. 6, lines 13-31 add:

10. A device to aid in determining in low light conditions the location of an external planer board trailing several fishing lines and selectively to light the planer board being pulled by a vessel or a rigid flag of said planer board to conform to standard lighting regulations for the vessel, comprising:
    a transparent waterproof enclosure;
    a light source operatively and mechanically connected within said transparent waterproof enclosure;
    an electrical power source and electrical components disposed within said transparent enclosure and connected to said light source;
    a switch connected to said electrical components to enable a user of said device to manually and selectively set said light source to an "OFF" condition or to a "RED" or "GREEN" condition to conform to said standard lighting regulations for said vessel;
    affixation means for rigidly affixing said device to a rigid portion of said external planer board or to a rigid portion of said rigid flag of said planer board whereby no portion of said device touches any of said fishing lines being trailed by said planer board;
    said switch comprises a dome switch protruding from said transparent enclosure;
    there is provided a reflective label affixed to said enclosure and covering said dome switch; and
    said reflective label being positioned relative to said affixation means so that when said device is rigidly affixed to said rigid portion of said external planer board or to said rigid portion of said rigid flag of said planer board, said reflective label faces toward said vessel and reflects back to a user in said vessel light from an external light source being used by said user in said vessel.

UNITED STATES PATENT AND TRADEMARK OFFICE
CERTIFICATE OF CORRECTION

PATENT NO.       : 7,337,578 B2
APPLICATION NO.  : 11/086638
DATED            : March 4, 2008
INVENTOR(S)      : Darren Edward Pieczynski It is certified that error appears in the above-identified patent and that said Letters Patent is hereby corrected as shown below:

Col. 6, lines 32-35, add:

11. A device according to claim 10, wherein:
   said affixation means includes a flange of said transparent waterproof enclosure having an aperture therein through which a securement device is disposed to rigidly affix said device to said rigid portion of said external planer device or to said rigid portion of said rigid flag of said planer board.

Signed and Sealed this

Tenth Day of June, 2008

JON W. DUDAS
*Director of the United States Patent and Trademark Office*